US009802805B2

(12) United States Patent
Singh

(10) Patent No.: US 9,802,805 B2
(45) Date of Patent: Oct. 31, 2017

(54) APPARATUS FOR STORAGE AND AGING OF WINE

(71) Applicant: Vijay Singh, Far Hills, NJ (US)

(72) Inventor: Vijay Singh, Far Hills, NJ (US)

( * ) Notice: Subject to any disclaimer, the term of this patent is extended or adjusted under 35 U.S.C. 154(b) by 50 days.

(21) Appl. No.: 14/850,091

(22) Filed: Sep. 10, 2015

(65) Prior Publication Data

US 2017/0073140 A1   Mar. 16, 2017

(51) Int. Cl.
| | | |
|---|---|---|
| *B65B 31/00* | (2006.01) | |
| *B67C 3/30* | (2006.01) | |
| *B67D 3/00* | (2006.01) | |
| *B67D 7/78* | (2010.01) | |
| *B65D 77/06* | (2006.01) | |
| *C12H 1/00* | (2006.01) | |
| *C12H 1/22* | (2006.01) | |

(52) U.S. Cl.
CPC ............ *B67C 3/30* (2013.01); *B65D 77/06* (2013.01); *B67D 3/0038* (2013.01); *B67D 7/78* (2013.01); *C12H 1/00* (2013.01); *C12H 1/22* (2013.01)

(58) Field of Classification Search
CPC ..................................................... B65D 81/245
See application file for complete search history.

(56) References Cited

U.S. PATENT DOCUMENTS

| | | | | |
|---|---|---|---|---|
| 4,475,576 A * | 10/1984 | Simon | ....................... | C12H 1/16 141/302 |
| 5,199,609 A | 4/1993 | Ash, Jr. | | |
| 8,640,746 B2 * | 2/2014 | Luis | ...................... | B65B 31/047 141/65 |
| 8,640,931 B2 | 2/2014 | O'Keefe, Jr. et al. | | |
| 8,757,439 B2 * | 6/2014 | Kambouris | .......... | B67D 1/0406 222/399 |
| 8,857,666 B2 | 10/2014 | O'Keefe, Jr. | | |
| 9,051,167 B2 * | 6/2015 | Burge | .................. | B67D 1/0462 |
| 2006/0112717 A1 | 6/2006 | Walton | | |
| 2011/0268838 A1 | 11/2011 | Vondrasek et al. | | |
| 2014/0097201 A1 | 4/2014 | Otto | | |

FOREIGN PATENT DOCUMENTS

| | | |
|---|---|---|
| DE | 3511506 A1 | 10/1986 |
| GB | 2483286 A | 3/2012 |
| WO | 02064456 A1 | 8/2002 |

* cited by examiner

*Primary Examiner* — Jason K Niesz
(74) *Attorney, Agent, or Firm* — Barnes & Thornburg LLP

(57) ABSTRACT

An apparatus for the storage and aging of wine that comprises of a disposable flexible bladder contained within a rigid support container. The flexible bladder has a fill/drain port connected to an internal dip tube that allows the bladder to be filled and emptied repeatedly without any contact with air. This allows the wine to remain fresh and unoxidized during storage and aging. The apparatus can be used in multiple support containers, such as barrels, IBCs, and tanks. The apparatus has no moving parts and uses disposable contact materials that eliminate washing and water usage. Single-use components ensure sanitary operation and this combined with the elimination of oxygen in contact with the wine produces consistently higher quality product.

14 Claims, 7 Drawing Sheets

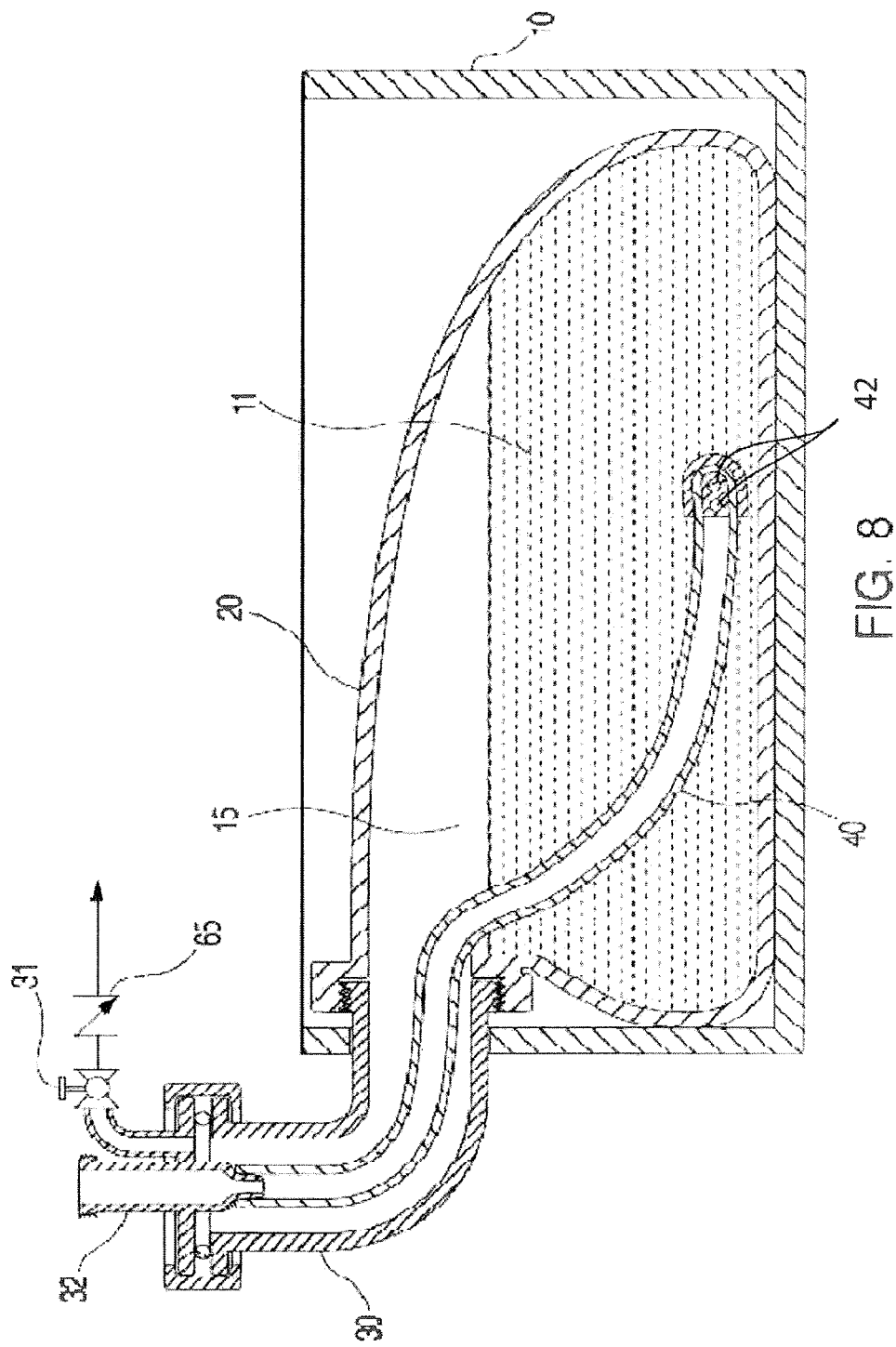

APPARATUS FOR STORAGE AND AGING OF WINE

FIELD

The disclosed embodiments relate to systems and methods for the storage and aging of wine.

BACKGROUND

Proper storage of wine has been a problem for hundreds of years. Containers used for storage range from amphorae in ancient times to wooden barrels and metal tanks in modern usage. When wine is exposed to air, compounds in the wine react with the oxygen in the air. These oxidized compounds substantially reduce and impair the quality of the wine. In the manufacture, and especially storage of wine, there is a continual need to prevent contact with air and hence reduce oxidation. This problem is particularly difficult to prevent in the conventional rigid barrels and tanks that are typically used for storage and aging. Due to sampling and evaporation, these containers are often partially full and the residual air in the headspace of the barrel or tank reacts with the remaining stored wine degrading it. Enormous effort is spent in wineries worldwide "topping" off these containers with fresh wine to keep them full to the brim. Wooden barrels have the additional problem that they are porous, and air can diffuse into the wine through the wood. In addition to the quality reduction due to oxidation, contact with air can also cause contaminating bacteria to grow, making the wine sour and undrinkable. This can lead to major loss and wastage.

Better methods for the storage of wine are essential because wine must often be stored for several years in order to develop characteristic flavors. It is essential during this aging process that the wine does not oxidize or spoil.

SUMMARY

Modern polymer materials have been developed that have low oxygen permeability. At least one disclosed embodiment uses these materials in a novel manner to provide an inexpensive apparatus for the storage and aging of wine that overcomes all the aforementioned problems.

The present disclosure relates to systems and methods for storage and aging of wine that minimizes contact with air during all operations with minimal operating labor and the elimination of wine required for "topping" off. The system provides a container that minimizes washing and waste water generation, yet is sanitary and does not introduce any contaminants such as bacteria or fungi into the stored wine. Finally, the apparatus must be easy to use and economical to operate.

Accordingly, disclosed embodiments may provide a flexible bladder comprising of an inert polymeric film that has very low oxygen permeability. This flexible bladder is placed inside a rigid container. This rigid container only serves to support the bladder and can be of any shape—vertical cylinder, cubic box, or horizontal barrel/drum. The material of construction of the rigid container is not important as the wine is contained inside the flexible bladder and does not contact the rigid container. The flexible bladder has a single fill/drain port. This port has two connections. One connection leads to a flexible tube inside the bladder that rests on the bottom of the bladder. This connection is used to fill wine into the bladder, and is also used to remove wine out of the bladder. The second connection is a vent that is used to exhaust air out of the bladder.

In operation, a new empty bladder may be placed inside the rigid container, and wine may be pumped in through the fill/drain port until a small amount of wine is seen coming out of the vent. This may indicate that the bladder is full of wine and that no air is present in the bladder. The vent is then closed. Wine may then be freely removed when necessary by pumping out of the fill/drain port. Unlike a barrel or tank, the bladder collapses as wine is withdrawn so there is no headspace where deleterious air could be introduced. Since the fill/drain port tube extends down to the bottom of the bladder, the entire contents can be pumped out without disturbing the bladder. This ensures that settled sediments are not re-suspended during sampling and removal.

In accordance with at least some embodiments, aging of wine includes development of a tannic flavor or "oaking." This may be performed by introducing an appropriate type and quantity of wood staves into the bladder. Oaking may easily be terminated when desired by transferring the wine to another bladder not containing wood staves. In some instances, micro oxygenation has been found to impart characteristic flavors.

In accordance with at least some disclosed embodiments, the bladder containing the wine may be resistant to oxygen permeation, so a precise amount of desired oxygen can be introduced by simply sparging oxygen into the bladder. The bladder may be designed to be disposable and inexpensive. The single use bladder ensures cleanliness and avoids any cross-contamination.

The above description, as well as additional objects, features, and aspects of the disclosed embodiments, will be more fully appreciated by reference to the following detailed description, including the accompanying drawings.

BRIEF DESCRIPTION OF THE DRAWINGS

FIG. 8 is a side sectional view of at least one disclosed embodiment showing a check valve to allow generated gases to vent without the possibility of air entering the bladder.

DETAILED DESCRIPTION

As discussed above, in operation, an empty bladder may be placed inside a rigid container, and wine may be pumped in through the fill/drain port until a small amount of wine is seen coming out of the vent. This may indicate that the bladder is full of wine and that no air is present in the bladder. The vent is then closed. Wine may then be freely removed when necessary by pumping out of the fill/drain port. Unlike a barrel or tank, the bladder collapses as wine is withdrawn so there is no headspace where deleterious air could be introduced. Since the fill/drain port tube extends down to the bottom of the bladder, the entire contents can be pumped out without disturbing the bladder. This ensures that settled sediments are not re-suspended during sampling and removal.

Figure 1:
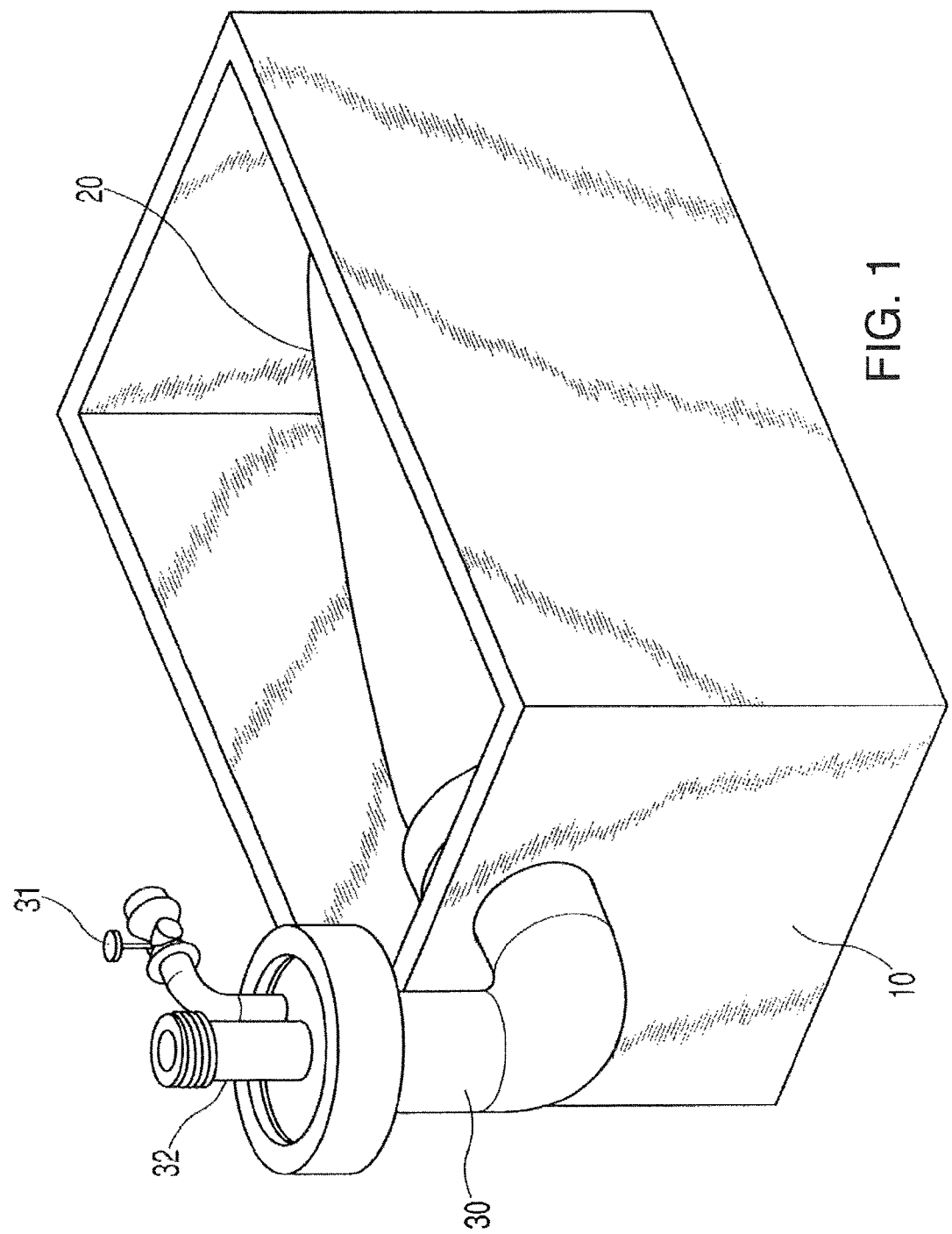
FIG. 1 is a perspective view of the disclosed embodiments illustrating the bladder placed within a rigid support container.

Referring to the drawings, FIG. 1 is a perspective view of an embodiment showing a bladder 20 containing wine placed inside rigid container 10. The bladder 20 may be attached via a connector 30 extending through an opening 8 the container 10 to a fill connector 32 and a vent 31. Bladder 20 may be made of various suitable materials. The bladder must be flexible and not impart any flavors or color to the wine. Modern polymer materials have been developed that have low oxygen permeability.

In general, FDA materials approved for long term food contact may be used. The bladder material must also be inert to ethanol (up to 20% v/v). Multi-ply metalized films are preferred because of their very low oxygen permeability. Accordingly, the flexible bladder may be placed inside a rigid container. This rigid container only serves to support the bladder and can be of any shape—vertical cylinder, cubic box, or horizontal barrel/drum. The material of construction of the rigid container is not important as the wine is contained inside the flexible bladder and does not contact the rigid container.

The flexible bladder has a single fill/drain port. This port has two connections. One connection leads to a flexible tube inside the bladder that rests on the bottom of the bladder. This connection is used to fill wine into the bladder, and is also used to remove wine out of the bladder. The second connection is a vent that is used to exhaust air out of the bladder.

Figure 2:
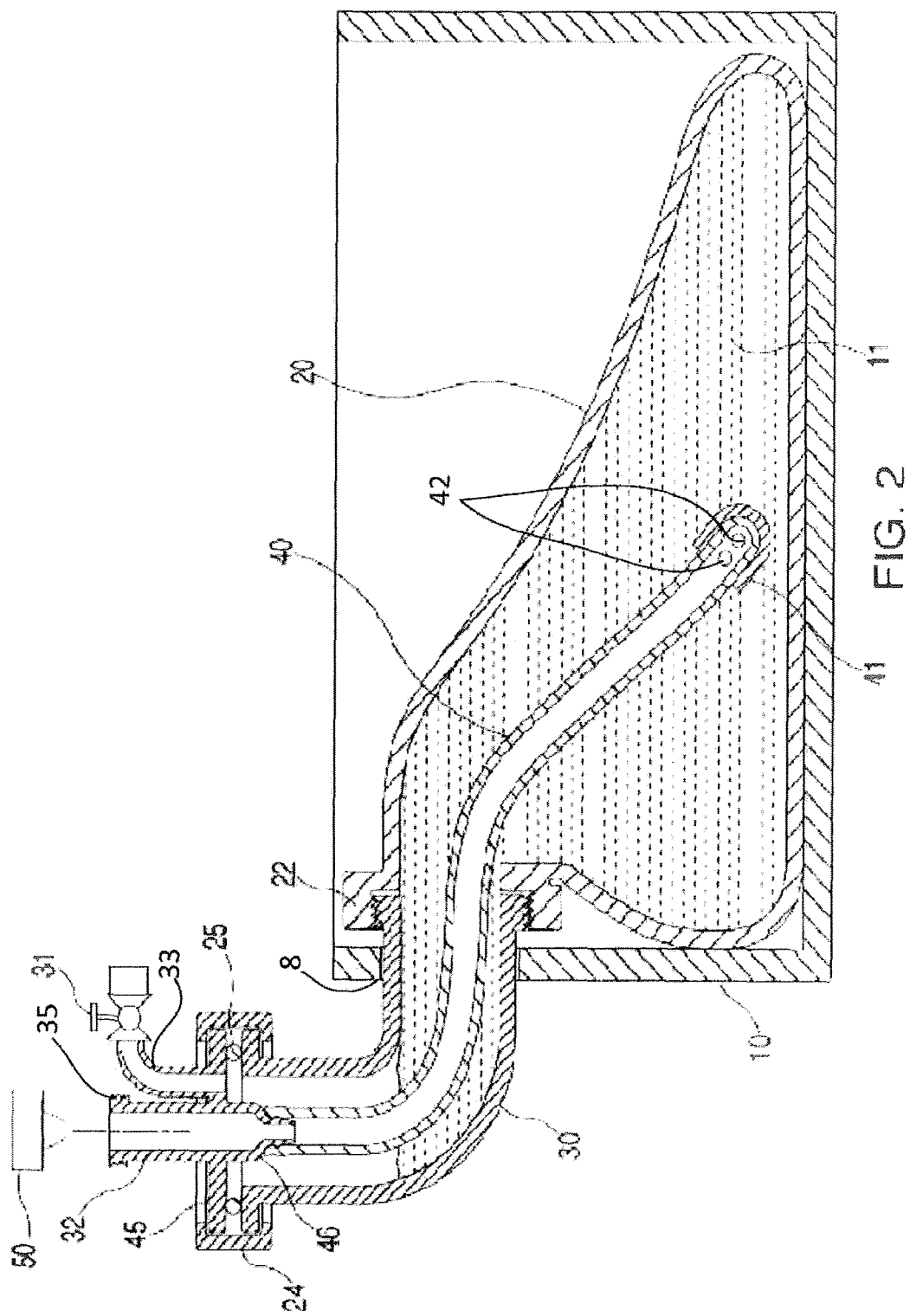
FIG. 2 is a side sectional view of the bladder and support container shown in FIG. 1.

In more detail in FIG. 2, the flexible bladder 20 is placed inside the rigid support container 10. The bladder has a fill/drain port 22. This is a molded plastic port that is thermally welded to the bladder 20. Port 22 has a female thread and is configured to be screwed on to a distal end of a mating connector 30 extending through opening 8 to make a gas and liquid tight connection between the inside of the fill/drain port 22 and connector 30. In some embodiments, the connector 30 may be integrally formed in the rigid support container 10.

Mating connector 30 is connected at a proximal end to a flange 45 by means of a clamp 24 and a gasket 25 creating a gas and liquid-tight connection. Flange 45 includes molded fill connector 32 and vent connector 33 extending away from connector 30. Vent connector 33 is attached to a vent 31. Fill connector 32 may be connected via threads 35 to an external wine source or a cap 50 to seal the fill connector 32 when not in use. Vent 31 may be a valve that can be opened and closed to provide provides venting of air from inside the bladder 20 to the atmosphere.

Flange 45 may also be connected to a flexible silicone rubber dip tube 40. Dip tube 40 is connected to flange 45 by inserting it into the barbed fitting 46 located in flange 45. A stainless steel weight 41 is connected to and extends around the other end of the rubber dip tube 40. This weight 41 has perforations 42 to allow liquid, such as wine 11, to enter dip tube 40 but prevent sediments on the bottom inside surface of the bladder 20 from being sucked out during removal of the stored wine. The rubber tube 40 is inserted into bladder 20. The weighted end 41 ensures that the dip tube rests on the inside bottom of the bladder 20.

In accordance with the disclosed embodiments, systems and methods for storage and aging of wine may minimize contact with air during all operations with minimal operating labor and the elimination of wine required for "topping" off. Thus, the system provides a container that minimizes washing and waste water generation, yet is sanitary and does not introduce any contaminants such as bacteria or fungi into the stored wine. Finally, the apparatus must be easy to use and economical to operate.

Figure 3A:
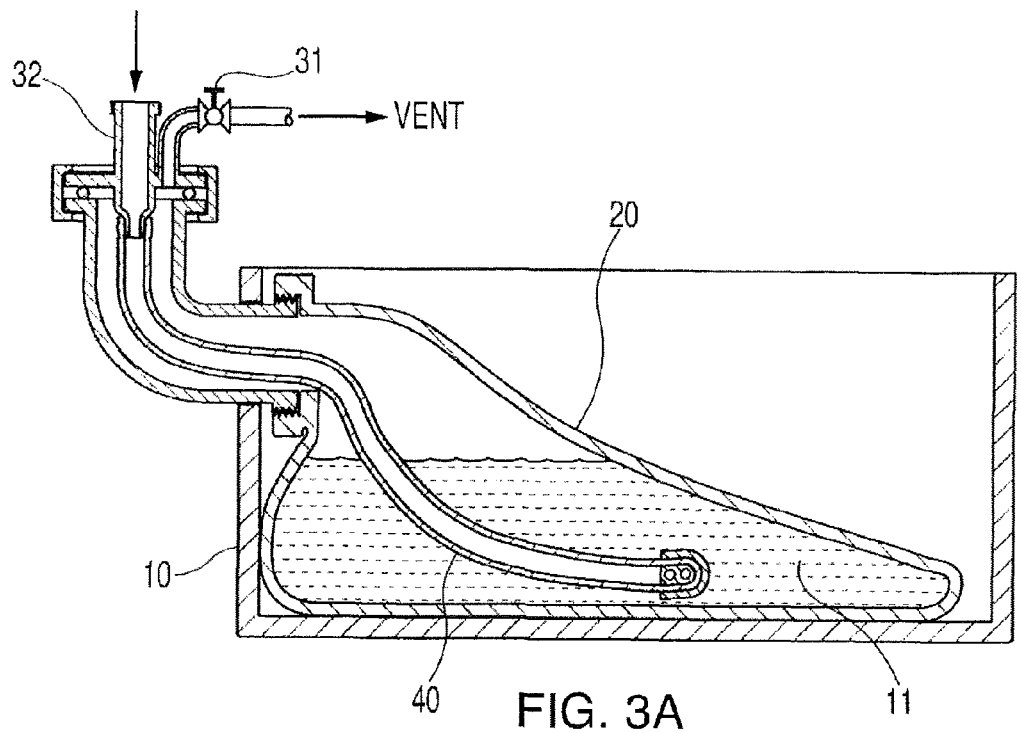
FIGS. 3A-3B are side sectional view showing the operation of the invention during filling in FIG. 3A and removal of wine in FIG. 3B.

FIG. 3A shows how bladder 20 is filled with wine 11 through port 22. As the bladder fills, any air inside the bladder is expelled through the open vent valve 31. Dip tube 40 ensures that liquid is not expelled until the bladder is completely full and which point liquid will escape out of the vent 31. At this point, the filling is stopped and vent valve 31 closed to prevent any air from backflowing into the full bladder. In the case of a partially filled bladder, an aspirator (not shown) may be connected to the vent valve 31 and a vacuum applied to remove any air from inside the bladder. Here as before, once liquid is detected coming out of the vent, vent valve 31 is closed and the vacuum aspirator is removed. During transfer operations, it is possible for air to get entrained into the wine. It is also possible for dissolved gases to come out of solution. In all these cases, using the vacuum aspiration technique as described earlier will serve to remove any air or gases from the bladder, leaving only wine in the bladder with no deleterious air-wine interface.

Figure 3B:
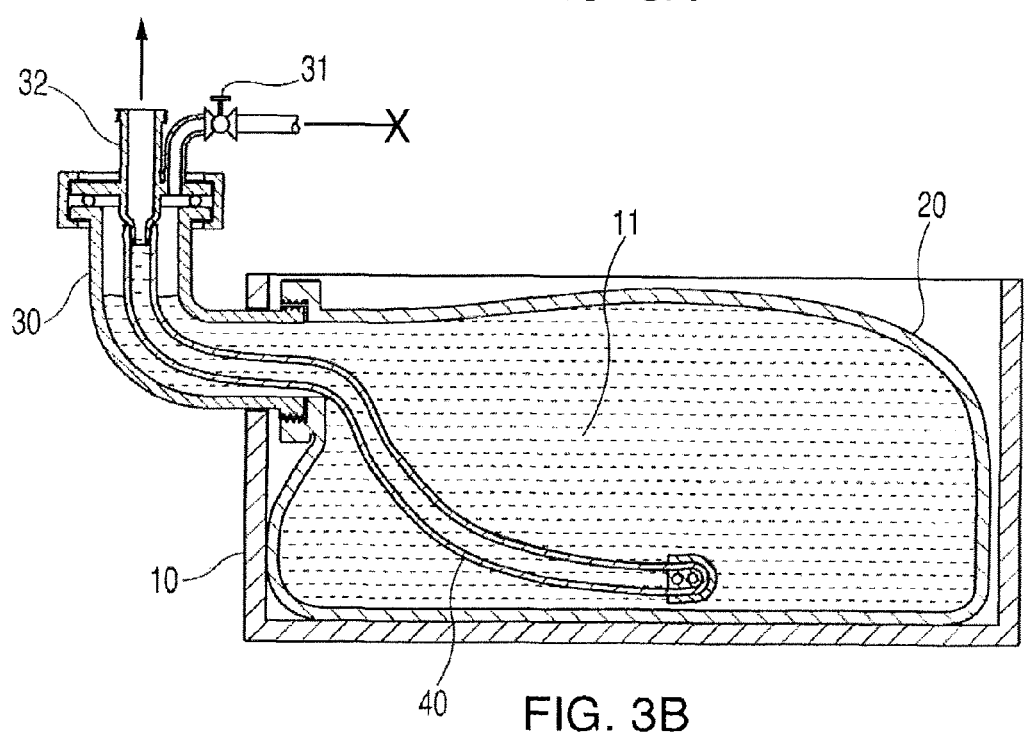

When removing wine from the bladder as shown in FIG. 3B, it is not necessary to open vent valve 31. As wine is withdrawn using a pump, the bladder will simply collapse on itself. In this manner no headspace is generated and no air is introduced to degrade the wine.

Figure 4:
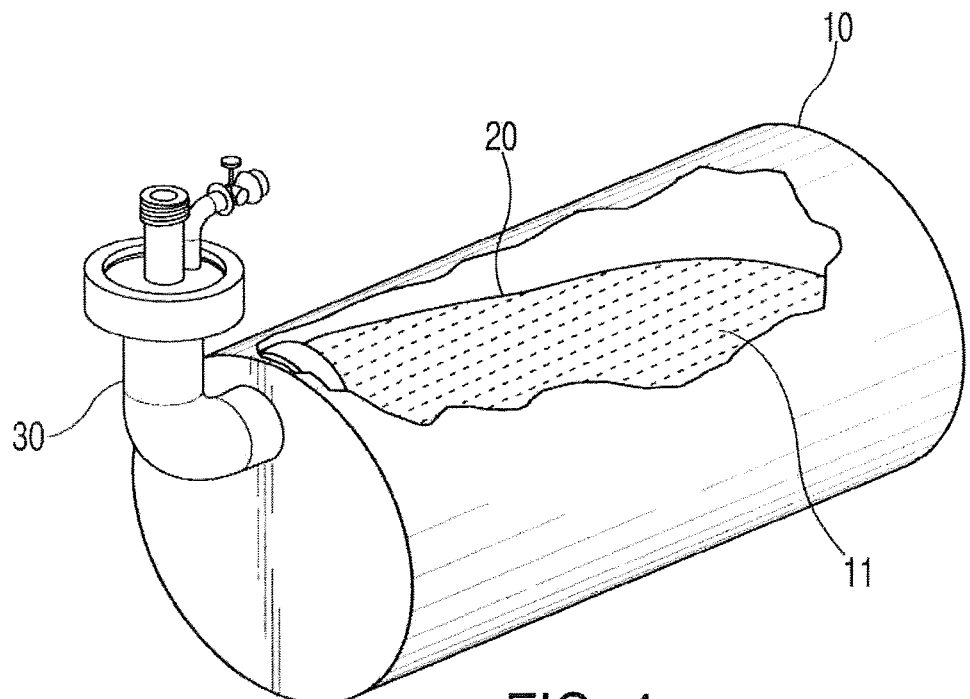
FIG. 4 is a perspective view of at least one disclosed embodiment in a horizontal barrel or drum format.

The flexible bladder 20 and connector 30 system are able to be used in various rigid containers as seen in FIGS. 4-7. FIG. 4 shows an example where the rigid container 10 is a barrel or drum. This type of container is common in wineries and suitable racks/shelving already exists. Unlike conventional barrels, however, the presently disclosed rigid support containers do not contact the wine and they may be made of stainless steel, wood, or any suitably rigid and strong material chosen mainly for esthetic purposes.

Figure 5:
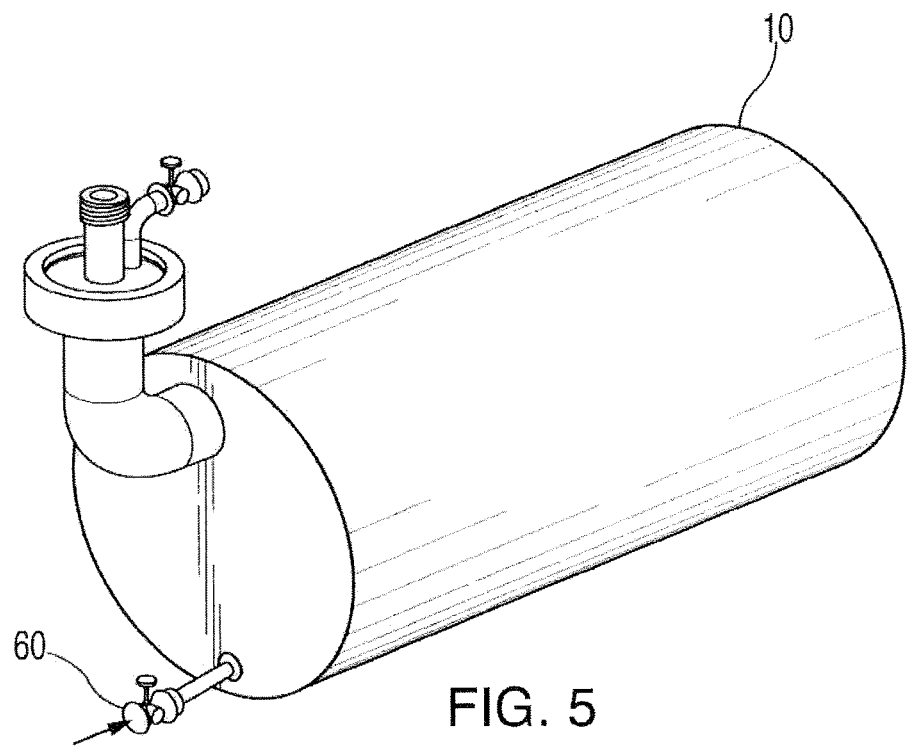
FIG. 5 is a side sectional view of the bladder inside a pressurized drum full of inert gas.

As seen in FIG. 5, a wine filled bladder 20 may be placed inside a stainless steel drum container 10. Connector 30 may be integrally formed with the container 10 or may be sealed to opening 8 in drum to form an airtight seal using conventional sealants. While the bladder may be manufactured using low oxygen permeability plastic film (<0.06 cc/100 in^2/day) a sealed outer drum container 10 may be used to reduce the possibility of oxidation over long storage periods. The drum container 10 is filled with inert gas (nitrogen or argon) using valve 60 in communication with the interior of the drum container 10 and maintained at a slight positive pressure (>0.1 psig). Since the environment outside the bladder may be completely oxygen free, even the slight oxygen permeability of the plastic bladder may be of no concern and the wine remains entirely free of oxygen as long as the outer rigid container remains pressurized with inert gas. This would enable the wine to be stored without damage for many decades.

Figure 6:
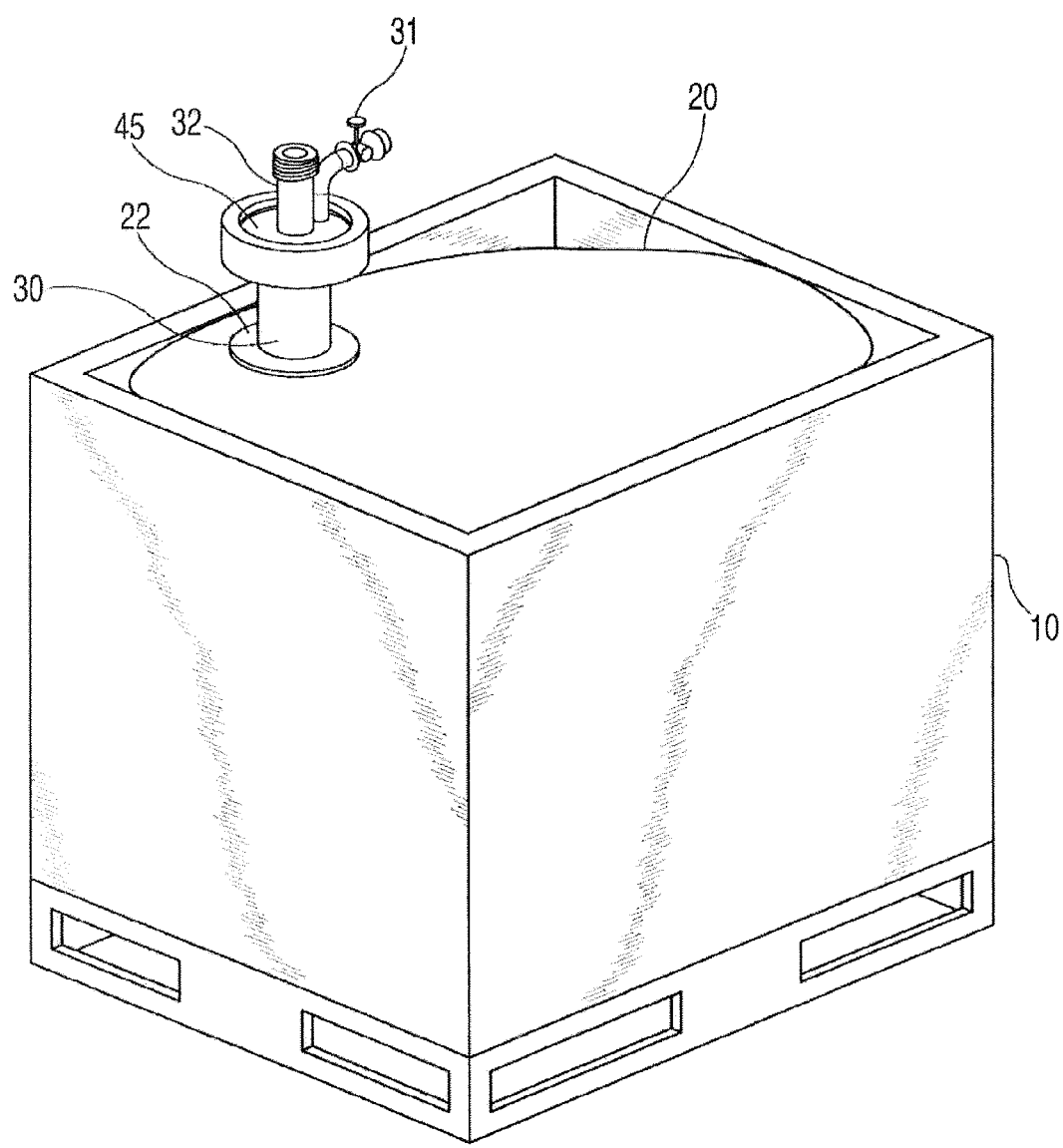
FIG. 6 is a perspective view of at least one disclosed embodiment in a cubic box format.

Another container that may be used with the bladder 20 is an intermediate bulk container 10 (IBC). These are commonly used for the transport and storage of liquids. FIG. 6 shows an example where the rigid support container 10 is an IBC cubic box. Due to the design of the single top entering fill/drain port 22 with integral dip tube 40, no expensive bottom discharge port is needed. All fill and drain operations are possible using the special fill/drain port 22 described in at least one disclosed embodiment. IBC containers 10 provide versatility as they can be moved around the winery using forklifts. Since the wine 11 does not contact the IBC container 10 itself, they can be made of cheaper non-food contact materials and they do not need to be washed, saving wash water and labor. Many IBC containers 10 are certified for truck shipment. Thus, wine in storage may be easily shipped for blending and bottling without the need to be transferred to another container. Eliminating these unnecessary transfer operations also reduces the possibility of deleterious air contact resulting in fresher and better quality wine.

Figure 7:
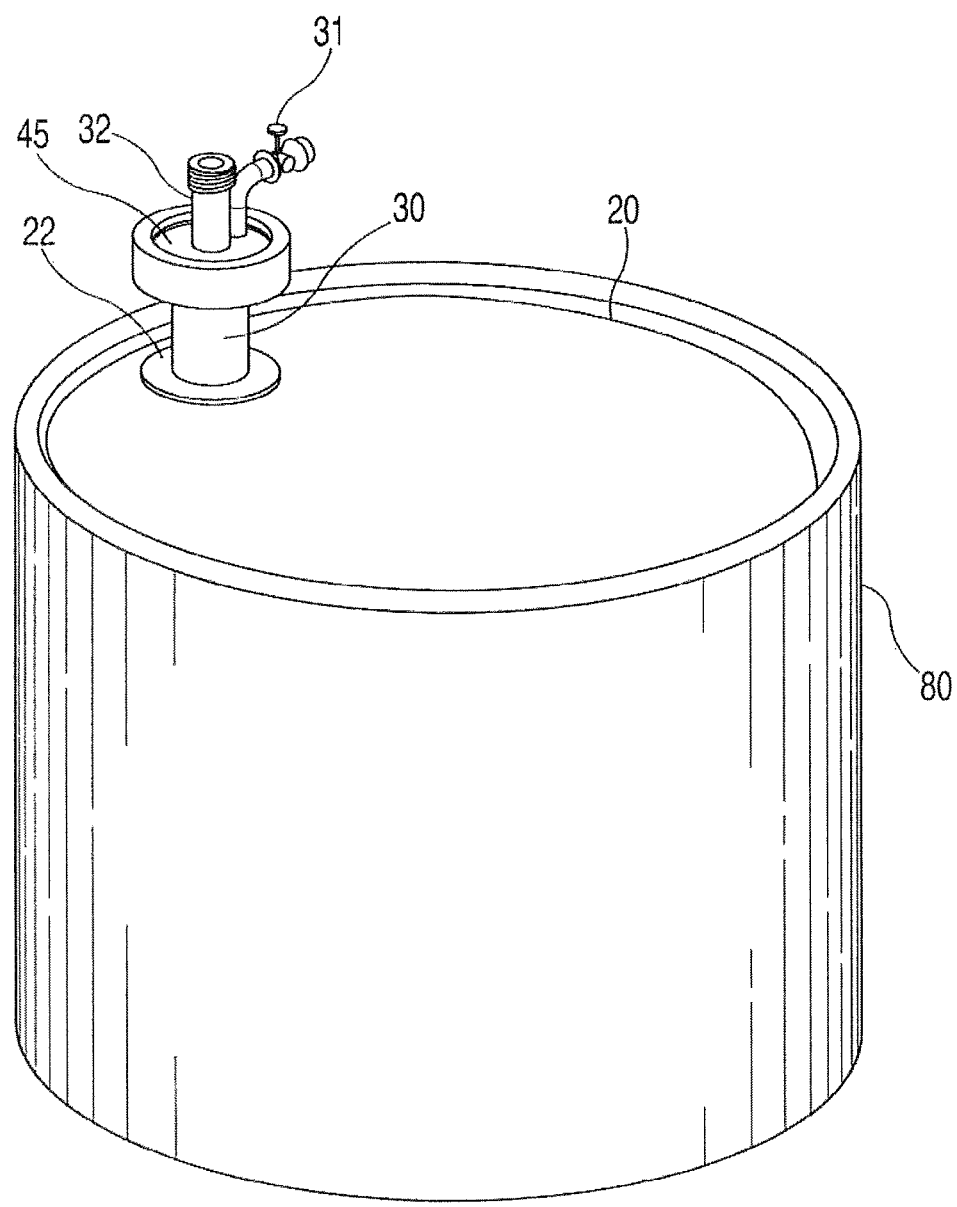
FIG. 7 is a perspective view of at least one disclosed embodiment in vertical cylinder (tank) format.

A vertical open top cylindrical tank 80 may also be used as a rigid support container as shown in FIG. 7. This option is useful for wineries that have existing vertical metal storage tanks. With at least one disclosed embodiment, a bladder 20 and connector 30 can simply be placed inside an existing vertical open top tank 80 and all the benefits of wine storage and aging without air contact are immediately available. The bladder can be sampled and wine removed without the danger of introducing air into the headspace as would be the case when wine is stored directly inside a rigid tank. There is no need for "topping off". In addition, as the wine now no longer contacts the metal tank walls directly, there is no need to wash the tank between batches. This reduces wash water usage, reduces cleaning labor, eliminates waster waste generation, and yet utilizes the existing installed tankage. The bladders are simply discarded after each use and the plastic itself can be recycled.

FIG. 8 is an embodiment of the assembly that can be used in fermentation. In certain types of wines, fermentation may continue during storage. This fermentation will generate gases that need to be vented to prevent the bladder from overpressure. In this situation, the vent valve 31 is left open as shown in FIG. 8. A check valve 65 is installed at the outlet of vent valve 31. This check valve enables generated gases to escape from the bladder headspace 15, but does not allow air from the outside environment to enter the bladder. This ensures that the bladder cannot overpressurize, but also ensures that air cannot enter to deteriorate the wine.

In some embodiments, aging of wine includes development of a tannic flavor or "oaking." This may be performed by introducing an appropriate type and quantity of wood staves into the bladder. Oaking may easily be terminated when desired by transferring the wine to another bladder not containing wood staves. In some instances, micro oxygenation has been found to impart characteristic flavors. The bladder containing the wine is resistant to oxygen permeation, so a precise amount of desired oxygen can be introduced by simply sparging oxygen into the bladder, for example, through fill connector 32. The bladder is designed to be disposable and inexpensive. The single use bladder ensures cleanliness and avoids any cross-contamination.

In accordance with at least one disclosed embodiment, a method of aging wine may include oaking. During oaking, staves may be introduced into the bladder through fill/drain port 22 (FIG. 2) prior to filling the bladder with wine. The wine may be sampled frequently during the oaking period. When the winemaker determines that the oaking is complete, the wine can be simply transferred to another bladder that does not contain oak staves via perforations 42 in the dip tube 40 and application of a vacuum to the fill/drain port to remove the wine so that sediments in the wine are not re-suspended and wood staves and sediment are not transferred during removal. By using fresh staves in each batch, it is possible using the disclosed embodiments to get perfectly or substantially reproducible oaking of each batch of wine. Wood products such as oak chips, pellets, and powders can also be used instead of staves. The equivalent oaking characteristics of a cask can be easily determined by computing the ratio of surface area of the staves or chips to the volume of wine in the bladder.

Wines are often matured in oak casks as the wood imparts tannic flavors to the wine. These casks are very expensive and can only be used 3-5 times before the wood is no longer effective. At least one disclosed embodiment can produce the same oaking effect in a much more cost effective and reproducible manner as described above using oak staves (wood sections used to make casks). These staves can be made from different wood species and can be toasted to provide different oaking characteristics.

It has been postulated that certain wines requires minute levels of oxygenation during aging in order to develop characteristic flavors. This is a fine balance, as it is well established that excess oxygen will ruin the wine. In traditional practice, this micro oxygenation is the result of oxygen permeating through the wooden casks or barrels typically used for aging. These wooden barrels are quite unpredictable in their oxygen permeability and this leads to a hit or miss process. In at least one disclosed embodiment, all accidental sources of oxygen are minimized and controlled. Oxygen required for micro oxygenation can be introduced in precise and reproducible amounts. This can be done by calculating the oxygen required per unit volume and then sparging in a metered volume of air or oxygen based on the wine volume in the bladder. This is a reproducible and controllable method as this is the only exposure to oxygen in the process.

Traditional winemaking uses sodium metabisulfite to combat the oxidation of wine due to poor practices and archaic technology. It is used to suppress oxidation caused by unavoidable contact with air inherent in traditional winemaking. The sodium bisulfate neutralizes free oxygen that is introduced in the winemaking and aging process and helps keeps the wine fresher and last longer. However, the introduction of sulfite does result in a discernable sulfurous odor, and causes allergic reactions in many individuals. This has lead to the requirement for a government warning about the sulfite content of wine to be posted on every bottle of wine. With at least one disclosed embodiment, oxygen is eliminated in the entire storage and aging process. This minimizes or can even eliminate the need to add sulfites to "stabilize" the wine, leading to a healthier and better quality product.

Although described with respect to containing wine, the container and bladder system may be used with any fluid that is desired to be kept in an oxygen controlled environment. Though the disclosed embodiment has been described by way of a detailed description in which various embodiments and aspects of the invention have been described, it will be seen by one skilled in the art that the full scope of the invention is not limited to the examples presented herein.

The invention claimed is:
1. A wine storage system comprising:
a flexible oxygen resistant bladder for storing and aging wine in;
a one-way valve adapted to vent liquids and gases from inside the bag in response to an increase in pressure inside the bag; and
means for filling and/or draining fluid from the bladder so that air or gases are removed from the bladder leaving only fluid in the bladder,
wherein the means for filling and/or draining fluid from bladder comprises a fill/drain port coupled to a weighted dip tube extending to the bottom of the bladder, wherein the fill/drain port is coupled to the bladder in an airtight manner.

2. The wine storage system of claim 1, wherein the fill/drain port couples to a connector housing via an airtight connection; wherein the dip tube connects to an extension of the fill/drain port and extends through the connector housing and rests at the bottom of the bladder.

3. The wine storage system of claim 1, wherein the weighted dip tube comprises perforations allowing liquid to enter the tube but preventing sediments inside the bladder from being sucked out during draining.

4. The wine storage system of claim 1, wherein the system further comprises an aspirator configured connect to the fill/drain port in an airtight manner and apply vacuum pressure to remove wine from the bladder; wherein the bladder collapses as wine is removed.

5. The wine storage system of claim 1, wherein the bladder includes a threaded coupling which couples to a connector housing through which the means for filling and/or draining fluid couples and extends.

6. The wine storage system of claim 1, wherein the flexible bladder includes an opening and a threaded coupling that mates with an interior threaded portion of a container, the container providing a connection arm on the exterior coupling with the means for filling/draining fluid.

7. A wine storage assembly comprising:
a flexible bladder resistant to oxygen permeability;
a flange that includes a vent and a fill/drain port;
wherein the vent and the fill/drain port are coupled to the bladder via an air-tight connector for introducing and removing wine via a dip tube extending into the flexible bladder; wherein the fill/drain port and dip tube cooperate with a pressure source to fill and/or drain fluid,
wherein the dip tube comprises perforations allowing liquid to enter the tube but preventing sediments inside the bladder from being sucked out during draining.

8. The wine storage assembly of claim 7, wherein the storage assembly further comprises a rigid container in which the flexible bladder resides and an opening in the container through which the connector extends to an exterior of the rigid container.

9. The wine storage assembly of claim 7, wherein the connector is an integral portion of a rigid container in which the flexible bladder resides.

10. The wine storage assembly of claim 7, wherein the airtight connector comprises a first end that threadingly engages the flexible bladder and a second end that couples with the flange via a clamp and gasket.

11. A method for storing wine comprising:
connecting an oxygen-resistant bladder to an airtight fill/drain port and a vent in a container;
pumping wine into the container via a fill/drain port and a dip tube extending to the bottom of the bladder; and
removing gases from the bag leaving only wine,
wherein removing gases from the bag comprises applying a vacuum to the vent;
drawing out air in the bladder so that the bladder collapses on itself until no headspace remains, or
wherein removing gases from the bag comprises pumping wine into bladder until the bladder is full of wine and a wine can be seen coming out of the vent.

12. The method of claim 11, further comprising aging the wine in the bladder by introducing staves or wood products into the bladder.

13. The method of claim 11, further comprising draining and transferring the wine into a new oxygen-resistant bladder after an amount of aging has occurred by applying a vacuum to the fill/drain port and removing the wine via the dip tube so that sediments in the wine are not re-suspended during removal and the staves or wood products and sediment are not transferred to the new bladder.

14. The method of claim 11, further comprising determining a volume of oxygen to be introduced into the bladder, and sparging the determined volume of oxygen into the bladder.

* * * * *